United States Patent [19]

Simons

[11] Patent Number: 4,807,860

[45] Date of Patent: Feb. 28, 1989

[54] MOTORCYCLE FRONT FORK ANTI-CAVITY DAMPING SYSTEM

[76] Inventor: Stephen W. Simons, 119 Jordan, Los Altos, Calif. 94022

[21] Appl. No.: 918,992

[22] Filed: Oct. 15, 1986

Related U.S. Application Data

[63] Continuation of Ser. No. 625,504, Jun. 28, 1984, abandoned.

[51] Int. Cl.$^4$ .............................................. B62K 25/08
[52] U.S. Cl. .................... 267/217; 188/280; 188/314; 188/322.13; 267/64.15; 267/226; 280/276; 280/709
[58] Field of Search .................... 267/8 R, 8 A, 64.15, 267/64.22, 64.28, 217, 218, 221, 228; 188/313, 318, 322.15, 322.14, 322.13, 322.11, 322.12, 314, 317, 315, 316, 281, 320, 322.22, 289, 280; 280/709, 276, 710, 714, 708

[56] References Cited

U.S. PATENT DOCUMENTS

| | | | |
|---|---|---|---|
| 3,078,967 | 2/1963 | Brown et al. | 188/314 X |
| 3,854,710 | 12/1974 | Nicholls | 280/709 X |
| 4,057,264 | 11/1977 | Suzuki et al. | 188/314 X |
| 4,515,384 | 5/1985 | Homma et al. | 188/318 |

FOREIGN PATENT DOCUMENTS

| | | | |
|---|---|---|---|
| 971584 | 7/1975 | Canada | 267/64.15 |
| 1095053 | 12/1960 | Fed. Rep. of Germany | 188/314 |
| 2244454 | 3/1973 | Fed. Rep. of Germany | 267/8 R |
| 2742701 | 3/1978 | Fed. Rep. of Germany | 280/276 |
| 992347 | 10/1951 | France | 267/64.15 |
| 57-134033 | 8/1982 | Japan | 188/281 |

Primary Examiner—Andres Kashnikow
Assistant Examiner—Matthew C. Graham
Attorney, Agent, or Firm—Limbach, Limbach & Sutton

[57] ABSTRACT

A motorcycle front fork assembly is disclosed in which a hollow damper rod is connected at its lower end to lower end of a hollow fork leg which telescopically receives an upper hollow fork tube and with a piston at the upper end of the damper rod engaging the interior surface of the fork tube. A float is positioned within the fork tube to float on the fluid within the fork tube. A float tube in which the float is positioned can be provided above the damper piston rod and including a fluid regulation valve. At least one compression port can be provided for fluid communication between a compression chamber defined between the fork leg and the damper rod below the lower end of the fork tube and a valve provides one way communication from the interior of the damper rod to the compression chamber during extension of the stroke of the fork assembly. The valve can include a slide that can close off or open a replenishment hole and a fluid passageway in the slide which is spring biased closed but can be opened. A slide is disclosed that is positioned between two springs which permit the slide to move to opposite directions on compression or extension.

24 Claims, 3 Drawing Sheets

MOTORCYCLE FRONT FORK ANTI-CAVITY DAMPING SYSTEM

RELATED APPLICATION

This application is a continuation of application Ser. No. 625,504 filed June 28, 1984, now abandoned.

1. Technical Field

The present invention relates generally to telescopic front fork damping systems for motorcycles and more particularly to a method and apparatus to prevent air entrapment and cavitation in damping systems.

2. Background Art

Most motorcycle front fork assemblies in production today use the same damping principles. These systems typically suffer from inconsistent damping from one bump to the next and over extended periods of time.

SUMMARY OF THE INVENTION

The object of the present invention is to provide a novel method and apparatus which overcomes the problem of air entrapment, cavitation, and air pressure build-up and enables better independent control of damping during compression and extension of the fork assembly.

Broadly stated, the present invention, to be described in greater detail below, is directed to method and apparatus for providing damping in motorcycle front fork assemblies and comprising an upper fork tube telescopically engaging a lower fork leg which together contain a substantially incompressible fluid and with a hollow damping rod connected at one end thereof to the lower end of the fork leg and having a piston at the other end of the damper rod slidably engaging the fork tube and wherein a floating piston means is positioned within the upper fork tube above the damper rod piston for floating on the fluid within the front fork assembly.

In accordance with this aspect of the present invention air is prevented from being drawn down into the damper rod thereby avoiding air entrapment and lack of compression damping, inconsistent damping, and internal air-pressure build-up inside the front fork assembly.

In accordance with another aspect of the present invention the floating piston method and apparatus comprise a float tube positioned in the fork tube above the damper rod piston and a floating piston means positioned within that float tube to float on the fluid within the float tube and with a fluid regulation valve through the float tube permitting inflow of fluid into the float tube on demand.

In accordance with still another aspect of the present invention wherein a compression chamber is defined between the lower end of the fork tube, the inside wall of the lower portion of the fork leg and the outside wall of the damper rod, a valving method and means provides communication between the interior of the hollow damper rod and the compression chamber.

In accordance with an aspect of the present invention incorporating the features of the last aforementioned aspect of this invention, a slide member is provided inside the damper rod for closing off communication between the compressing chamber and the inside of the damper rod.

In accordance with still another aspect of the present invention a damper rod, means for providing a float on the fluid in the fork assembly and valve means for providing communication between the interior of the damper rod and a compression chamber in the bottom of the fork leg are assembled as a kit for replacement of the damper rod of front fork assemblies manufactured without the features of the present invention.

A feature and advantage of the last aforementioned aspect of the present invention is the provision for easy replacement of the damper rod of prior art front fork assemblies to incorporate the advantages of applicant's invention.

In accordance with still another aspect of the present invention a method and a fork cap apparatus are provided such that the interior of the fork assembly is open to atmosphere at full extension of the fork assembly, thereby preventing pressure build-up within the front fork assembly.

These and other aspects, features and advantages of the present invention will become more apparent upon a perusal of the following description taken in conjunction with the accompanying drawings.

DESCRIPTION OF THE PRIOR ART

Referring now to the drawing, with particular reference to FIGS. 1-4, there is illustrated the typical construction and operation of motorcycle front fork assemblies in accordance with the prior art. A front fork assembly 11 is provided on a motorcycle 12 and made up of a pair of front fork members 13, each secured to the steering stem 14 of the motorlcycle at or adjacent to the top of the front fork member 13. Each front fork member is made up of an upper fork tube 15 closed by a cap at the top thereof and a lower fork tube or fork leg 17 which is telescopically, sealably movable with respect to the upper fork tube. The lower fork tubes 17 are provided with axle bosses 18 on which the motorcycle front wheel is mounted.

Each front fork member 13 is provided with a hollow cylindrical damper rod 19 having an axial damper chamber 20 and secured such as by means of a bolt 21 at the lower closed end of the lower fork tube 17. A damper piston 22 is provided on the uper end of the damper rod 19 including a piston ring 23 engaging the inside surface of the upper fork tube which telescopically moves within the lower fork leg 17. An incompressible fluid 31, such as oil or hydraulic fluid, is contained within the front fork assembly for movement between various chambers for damping.

Figures 1, 2A:
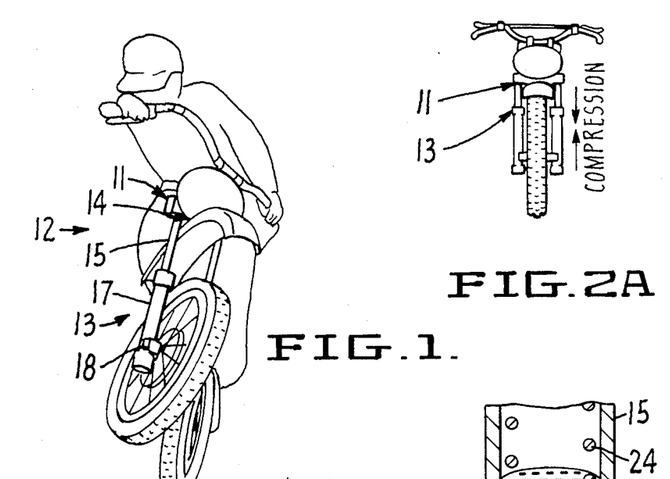
FIG. 1 is a perspective view illustrating front forks on a motorcycle.
FIGS. 2A and 2B are front elevational views of a motorcycle, respectively showing the front fork assembly in compression and in extension.
Figure 2B:
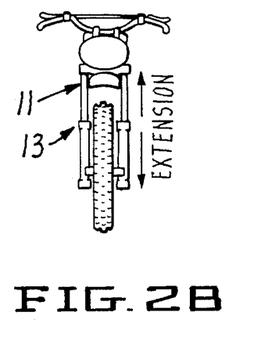

A main spring 24 is positioned between the top of the damper piston 22 and the cap which closes the upper end of the upper fork tube 15 to hold the front fork member 13 in extended position as shown in FIG. 2B and return it to extended position after compression as shown in FIG. 2A.

A one-way valve 25 is provided between the damper rod 19 and the inside surface of the upper fork tube 15 to allow fluid upon compression of the fork member to pass from a compression chamber 26 at the lower end of the member between the damper rod 19 and inside surface of the lower fork leg 17 into an expansion chamber 27 between the damper rod 19 and the inside surface of the upper fork tube 15. Typically, one or more compression holes or ports 28 are provided through the damper rod 19, permitting flow of fluid from the compression chamber 26 into the damper chamber 20 upon compression and from the damper chamber 20 into the compression chamber 26 on extension. A rebound orifice 29 is provided near the upper end of the damper rod 19 for permitting flow of rebound fluid from the expansion chamber 27 through the orifice 29 into the damper chamber 20 upon extension, as illustrated in FIG. 3B.

Figure 3A:
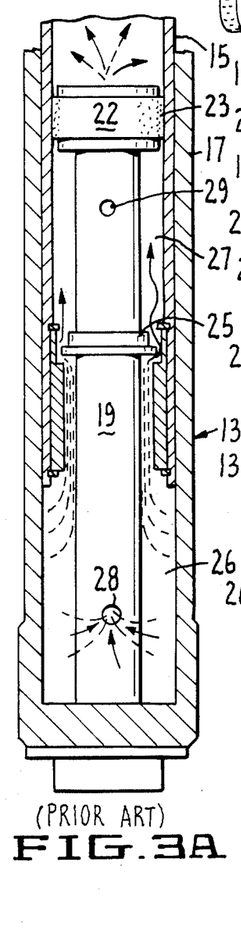
FIGS. 3A and 3B are elevational, sectional views of a typical prior art front fork member illustrating the flow of fluid, respectively under compression and under extension of the fork member.
Figure 3B:
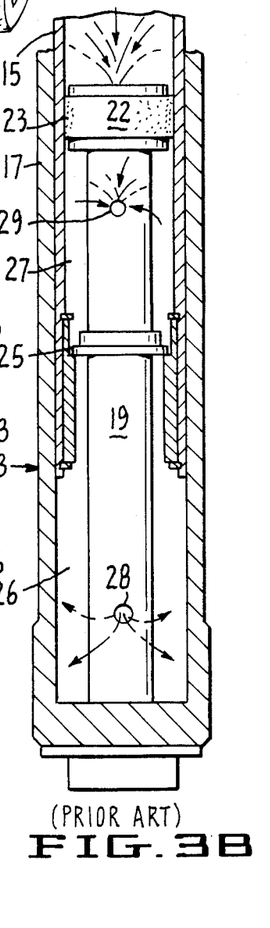
Figures 4A, 4B:
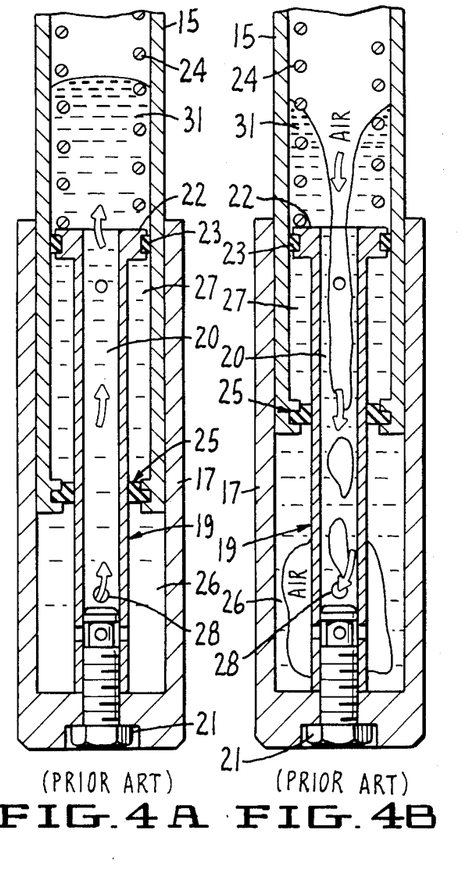
FIGS. 4A and 4B are schematic, elevational, sectional views similar to FIGS. 3A and 3B but with additional parts in section and illustrating operations believed to exist in prior art front fork members.

The use of the same compression hole 28 for flow under compression as shown in FIG. 3A and extension as shown in FIG. 3B results in the employment of a hole size that is not optimum for both operations. These holes should be small for good control during the compression stroke and large for a rapid return of fluid back into the compression chamber 26 during the rebound or extension stroke. Therefore, in standard design, performance is compromised by using the same holes for oil passage in both directions.

It has been discovered that damping of standard motorcycle front fork assemblies is not stable from stroke to stroke. Also, at higher speeds of compression, extension, compression, extension, etc., there was a deterioration of the damping quality. A lack of damping was noticed over part of the stroke, and as the speed of repetition increased, the lack of damping became more noticeable both in extension and in compression. Since applicant's discoveries in accordance with the present invention, applicant has come to suspect that as air is drawn into the system in the manner illustrated in FIG. 4B, the problems of air entrapment result.

DESCRIPTION OF PREFERRED EMBODIMENTS

Figure 5:
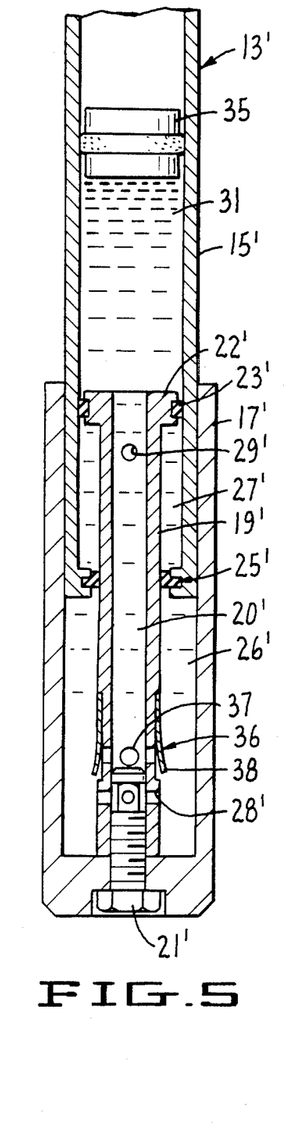
FIG. 5 is an elevational, sectional view of a motorcycle front fork member incorporating features of the present invention.

Preferring now to FIG. 5, there is illustrated one preferred embodiment of the present invention. As illustrated in FIG. 5, a float or floating piston 35 is positioned within the upper fork tube 15' for floating on the fluid 31 for preventing air from being pulled down the center of the damper rod 19' in the manner in which the air is shown flowing down the damper rod in FIG. 4B.

The front fork member 13' in FIG. 5 also includes a one-way valve 36 at the base of the damper rod 19' for providing one-way communication from the damper chamber 20' to the compression chamber 26' during the extension stroke of the fork member 13'. The valve 36 includes replenishment holes 37 in the damper rod 19' and reed valve elements 38 which close off the replenishment holes 37 during compression but open during the extension stroke.

Figure 6:
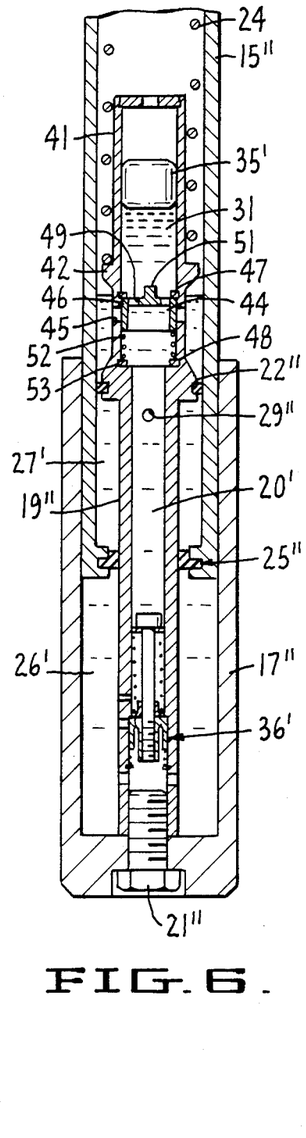
FIG. 6 is an elevational, sectional view of an alternative embodiment of the present invention.
Figure 7:
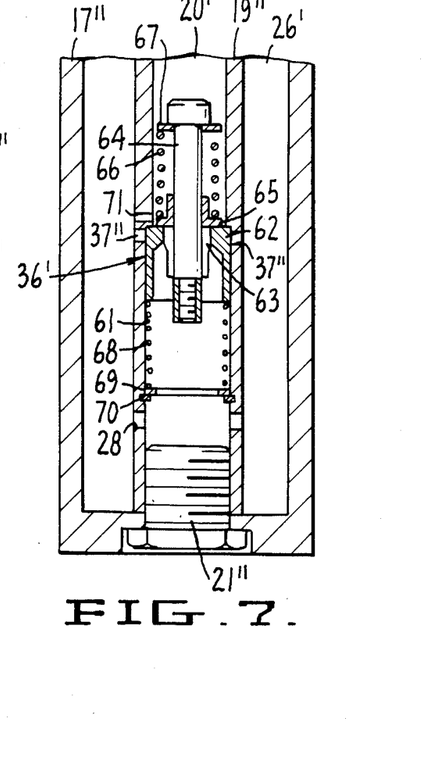
FIG. 7 is an enlarged elevational, sectional view illustrating one embodiment of the base valve of the front fork assembly illustrated in FIG. 6.
Figure 8:
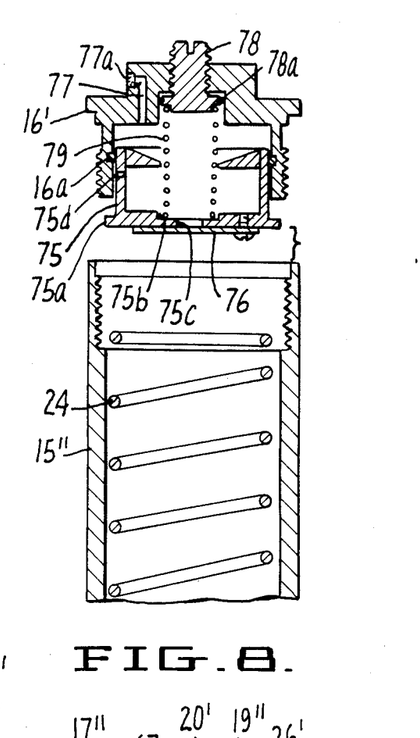
FIG. 8 is an enlarged, partially exploded, elevational, sectional view illustrating the top of a front fork member incorporating features of the present invention.
Figure 9:
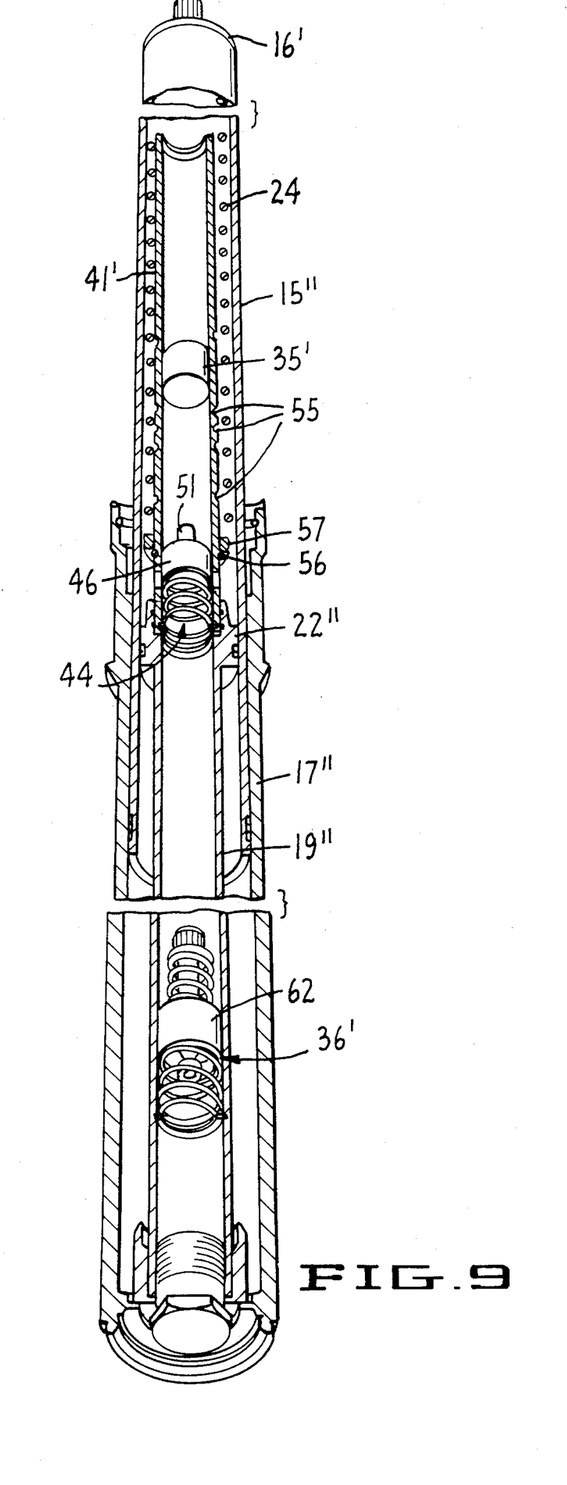
FIG. 9 is a foreshortened sectional view, partially in perspective, illustrating features of the front fork member of the type illustrated in FIGS. 6-8 for describing the parts that would be sold as a replacement kit for the damping system of motorcycle fork assemblies.

Referring now to FIGS. 6–8, there is shown an alternative embodiment of the present invention. As shown there, a float tube 41 is provided at the top of the damper rod 19". The float tube can be mounted on the damper rod 19" by insertion in a cavity within the damper piston 22" as illustrated in FIG. 9. The float tube 41 includes an outside spring seat shoulder 42 for engagement with the lower end of the main spring 24 of the front fork member. An upper keeper clip 43 is provided in the upper end of the float tube 41 for capturing the float 35' therebelow. A fluid regulation valve 44 is provided at the lower end of the float tube 41 for controlling oil replenishment and includes oil replenishment holes 45 in the float tube 41 and an inverted cup-shaped slider 46 captured within the float tube below a keeper clip 47 and above a keeper clip 48. The slider 46 is provided with apertures 49 in the top thereof permitting axial flow of fluid therethrough and an upwardly extending axial projection 51 engageable by the float 35' when the float approaches and reaches the bottom of its travel. Instead of the projection 51 on the slider 46, a projection could be provided on the bottom of the float to engage the slider 46. A spring 52 is captured between the slider 49 and an annular washer 53 held by the lower keeper 48 for spring-biasing the slider 49 in an upper position in which the walls of the slider 49 close off the oil replenishment holes 45.

With the float 35' and the fluid regulation valve 44, fluid is captured in the damping system and in the float tube 41 below the float 35'. Extra fluid is stored outside the float tube 41 and can be used by the system on demand through the fluid regulation valve 44. With this construction, ari in the fork tube member is separated from the fluid.

The base one-way valve 36' in the embodiment of FIGS. 6–9 of the invention is illustrated in FIG. 7. Referring to FIG. 7, the lower end of the damper rod 19" includes a counterbore 61 for receiving a cup-shaped slide 62 provided with an axial passageway 63 through the cup for fluid passing from the compression holes 28 into and up through the damper rod 19" during the compression stroke. Means are provided on the slide 62, such as a screw 64 for mounting an axial passageway closure such as a compression plate 65 for closing off the axial passageways 63 during the extension stroke. The compression plate 65 is slidably mounted on the screw 64 and biased in closed position by a spring 66 captured between the compression plate 65 and a washer 67 at the head of the screw 64. Spring 66 controls the pressure level at which the pressure plate 65 will open to allow passage of fluid on compression. A spring 68 is captured below the slide 62 by a washer 69 and keeper clip 70. The spring 68 controls the pressure level at which the slide 62 moves downward to open the replenishment holes 37" on the extension stroke. At least one compression bleedhole 71 is provided in the damper rod above the base valve 36'.

On extension, the base valve 36' slides as a unit down the center of the damper rod 19" against the pressure of the positioning spring 68 under the force of the fluid flow to expose the replenishment holes 37" with sufficient flow to optimize the replenishment. On the compression stroke, the slide 62 of the base valve 36' returns to the top of the counterbore 61 and oil that is under high pressure flows through the compression bleedhole 71, and when the pressure reaches a sufficient level, the compression plate 65 is lifted from its seat, allowing fluid to flow through the axial passageways 63, around the compression plate 65 and up the center of the damper rod 19". The size of the compression bleedhole 71 and the spring rate and pre-load of compression spring 66 determine the compression damping characteristics.

To eliminate pressure build-up in the front fork member 13" a fork cap 16' is provided with a fork cap valve that is open when the fork is at full extension and closes under the force of the main spring 24 as the fork is compressed. With reference to FIG. 8, the cap valve in accordance with this embodiment of the present invention includes a cup-shaped valve member 75 which is provided with an outwardly extending flange 75a at the base of the cup 75 for engagement with the lower end of the cap 16' and with the main spring 24, an O ring 16a recessed in the cap 16' seals the outside surface of cup 75 and the cap 16'.

A spring seat recess 75b is centered around an aperture 75c in the bottom of valve member 75. A valve element such as a reed valve 76 is provided for the aperture 75c to allow passage of oil back into the fork tube 15". An air port 7d is provided in the side wall of valve member 75 as a vent when the fork tube is at full extension.

A vent passageway 77 is provided through the top of the cap 16' and includes a filter member therein' such as a sintered bronze filter element 77a at the outer end of the passageway 77, to prevent passage of water and help build up pressure in the cap 16' sufficient to open the reed valve 76. A pre-load adjustment screw 78 passes through an aperture in the center of the cap 16' and is sealed with an O ring 78a. A pre-load spring 79 is positioned in the cap 16' between the screw 78 and the seat 75b in the valve element 75. Still air in the valve element 75 allows oil to drop out of the air flow in the cap valve for return to the fork tube. The pre-load spring 79 is used to overcome any pre-load of the main spring 24 and insures that the vent 75d is open at full extension of the fork.

FIG. 9 illustrates the elements of the embodiment shown in FIGS. 6–8 and how appropriate parts of the assembly of the embodiment shown in those drawings can be sold as a replacement kit to adapt prior art front fork assemblies to incorporate applicant's invention. As illustrated in FIG. 9 the float tube 41' includes a plurality of grooves 55 spaced along the length of the exterior surface thereof for receiving a spring seat retaining ring 56 which, when located in the groove, will prevent axial movement of a spring seat ring 57 which slides over the top of the float tube 41' and serves as the lower support for the main spring 24.

A replacement kit can be sold including the damper tube 19" containing its base valve 36' and the float tube 41' with its float 35' and fluid regulation valve 44 along with the spring seat retaining ring 56 and spring seat ring 57. The replacement kit includes instructions for removal of the existing damper tube in a front fork assembly and replacement with the damper tube and float tube in the manner illustrated. The grooves on the outside surface of the float tube 41' permit the kit to be utilized in front fork assemblies of various different constructions by different manufacturers and also permit location of the spring seat retaining ring 56 at different positions to provide a different pre-load of the main spring to establish the firmness of the fork over small bumps.

Figure 10:
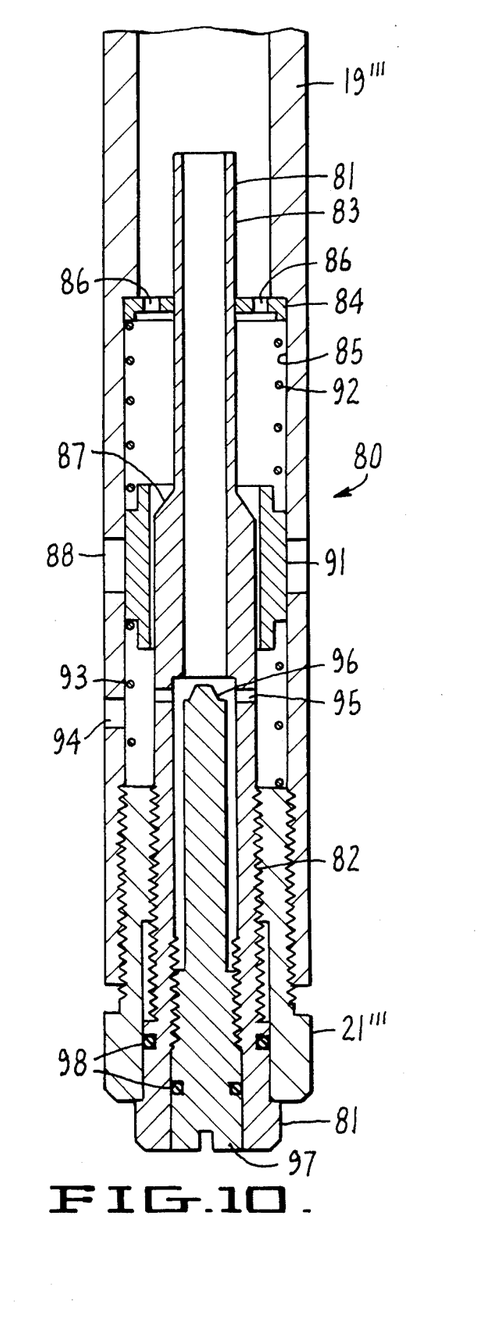
FIG. 10 is an elevational, sectional view of a portion of the elements of a front fork member illustrating an alternative base valve assembly to that illustrated in FIG. 7.

Another base valve assembly 80 and method is illustrated in FIG. 10. As shown there a hollow cylindrical metering rod 81 is located within the lower end of the damper rod 19'''. The metering rod can be located for adjustment by being screw threaded such as at 82 through the bolt 21''' which secures the damper rod 19''' in the bottom of the fork leg (not shown). The upper end 83 of the metering rod 81 is centered within the damper rod 19''' by passage through a washer 84 located at the upper end of a counterbore 85 in the damper rod 19''' and apertured at 86 for passage of fluid. The damper rod includes a tapered metering section 87 which reduces the outside diameter of the metering rod 81 in the direction upward of the metering rod 81.

The damper rod 19''' is provided with fluid replenishment apertures 88 adjacent the tapered metering section 87, and a sliding sleeve 91 is provided between the metering rod 81 and damper rod 19''' for closing off the apertures 88 but axially moved up or down to open passage through apertures 88. A first spring 92 for compression damping is positioned between the sliding sleeve 91 and the washer 84, and a second spring 93 between the sliding sleeve 91 and the upper end of the bolt 21'''. A damper rod bleed port 94 is provided through the damper rod 19''' below the normal rest position for the slide 91 in absence of compression or extension and adjacent a metering rod bleed port 95 providing fluid passage through the metering rod 81. A needle valve is provided within the metering rod 81 at the upper end of a bleed screw 97 located at the lower end of the metering rod 81. The bleed screw 97, the metering rod 81 and the bolt 21''' are sealed by O-rings 98.

The sliding sleeve 91 moves under the force of compression or extension to expose the replenishment apertures 88. Upon compression, compression pressure through the bleed port 94 causes the slide to move upward against the force of compression spring 92. When the oil pressure rises significantly the sliding sleeve 91 exposes the metering section 87. The angle of the metering section 87 is selected to control high speed damping.

By turning the base of the metering rod 81 with respect to the bolt 21''' a mid-range speed adjustment is effected by altering the pressure needed to expose the metering section 87.

By turning the bleed screw 97, the needle valve 96 is adjusted to alter the low speed damping.

On extension of the front fork assembly fluid passing through the apertures 86 in washer 84 push the sliding sleeve 91 against the force of the extension damping spring 93 for allowing fluid passage out of the replenishment holes 88.

By changing the angle of the tapered metering section 87 high speed compression damping will change without affecting other characteristics. This change can be accomplished by removing the metering rod 81 and substituting a metering rod with a different angled taper.

I claim:

1. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the loswer end of said fork leg, said damper rod having a piston at its upper end slidably engaging the interior surface of said fork tube, and floating means positioned with said fork tube to float on the fluid within said fork tube for preventing air from entering said damper rod, said floating means for preventing air from entering the interior of said damper rod including a float tube positioned in said fork tube above said damper rod piston, a float positioned within said float tube to float on the fluid within said float tube, and a fluid regulation valve permitting replenishment fluid flow through said float tube into the interior of said float tube when said float reaches the bottom of its travel.

2. The apparatus of claim 1 including means for venting the interior of said fork assembly to atmosphere upon extension of the fork assembly.

3. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially imcompressible fluid, a hollow damper rod connected at its lower end to the lower end of said fork leg, said damper rod having a piston at its upper end slidably engaging the interior surface of said fork tube, and floating means positioned with said fork tube to float on the fluid within said fork tube for preventing air from entering said damper rod, said floating means for preventing air from entering the interior of said damper rod including a float tube positioned in said fork tube above said damper rod piston, a float positioned within said float tube to float on the fluid within said float tube, and a fluid regulation valve permitting replenishment fluid flow into the interior of said float tube when said float reaches the bottom of its travel including at least one fluid replenishment port in said float tube, and a slider means slidably positioned within said float tube for movement across and closure of said fluid replenishment port, said slider means spring-biased for closure of said fluid replenishment port, cooperative means between said slider means and said float for opening said replenishment port when said float reaches the bottom of its travel.

4. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the lower end of said fork leg, said damper rod having a piston at its upper end slidably engaging the interior surface of said fork tube, and floating means positioned with said fork tube to float on the fluid within said fork tube for preventing air from entering said damper rod, said floating means for preventing air from entering the interior of said damper rod including a float tube positioned in said fork tube above said damper rod piston, a float positioned within said float tube to float on the fluid within said float tube, and a fluid regulation valve permitting replenishment fluid flow into the interior of said float tube when said float reaches the bottom of its travel, said float tube including a plurality of grooves in the external surface thereof, a spring seat retaining ring adapted to be positioned in one of said grooves, and a spring seat slidable over said float tube for engagement with said spring seat retaining ring whereby said spring seat retaining ring can be positioned in selected different grooves.

5. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the lower end of said fork leg, said damper rod having a piston at its upper end slidably engaging the interior surface of said fork tube, and floating means positioned with said fork tube to float on the fluid within said fork tube for preventing air from entering said damper rod, a compression chamber defined between said fork leg and said damper rod below the lower end of said fork tube;

at least one compression port providing fluid communication between said compression chamber and the interior of said damper rod, valve means for providing one-way communication from the exterior of said damper rod to said compression chamber during the extension stroke of said fork assembly comprising at least one replenishment hole provided in said damper rod, a slide movable within the lower end of said damper rod between a spring-biased position closing off said replenishment hole and a position leaving said replenishment hole open, at least one fluid passageway in said slide permitting axial flow of fluid through said slide, and a compression plate spring-biased to close off said fluid passageway but permitting opening of said fluid passageway under a predetermined fluid pressure from fluid flow from said compression chamber through said compression port.

6. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the lower end of said fork leg, said damper rod having a piston at its upper end slidably engaging the interior surface of said fork tube, and floating means positioned with said fork tube to float on the fluid within said fork tube for preventing air from entering said damper rod, a compression chaamber defined between said fork leg and said damper rod below the lower end of said fork tube, valve means for providing fluid communication between said compression chamber and the interior of said damper rod, comprising a metering rod positioned within the bottom of said damper rod, at least one fluid passage through said damper rod, a sliding sleeve positioned between the interior surface of said damper rod and the exterior surface of said metering rod for closing off fluid flow through said fluid passage, first spring bias means biasing said sliding sleeve downward, said first bias means yielding upon compression of said front fork assembly to allow said slide sliding sleeve to move upward for flow of fluid from said compression chamber into said damper rod, second spring bias means biasing said sliding sleeve upward, said second bias means yielding upon extension of said front fork assembly to allow said sliding sleeve to move downward for flow of fluid from said damper rod into said compression chamber and at least one fluid bleed port through said damper rod below the normal rest position of said sliding sleeve in absence of compression or extension.

7. The apparatus of claim 6 including a tapered metering section on the outside surface of said metering rod exposed by travel of said sliding sleeve for controlling the damping of said front fork assembly, and means for adjusting the relative position between said sliding sleeve and said metering rod and said metering section.

8. The apparatus of claim 7 including at least one metering rod bleed port through said metering rod and means for controlling flow of fluid through said metering rod bleed port for adjusting the low speed damping of said front fork assembly.

9. A motorcycle front fork assembly comprising, in combination, an upper hollow cylindrical fork tube, a lower hollow cylindrical fork leg closed at its lower end, said fork tube and said fork leg telescopically, sealably movable with rrespect to one another and containing a substantially incompressible fluid, a hollow damper rod connected at its lower end to the lower end of said fork leg, said damper rod having a piston; at its upper end slidably engaging the interior surface of said fork tube, a compression chamber defined between said fork leg and said damper rod below the lower end of said fork tube, at least one compression port providing fluid communication between said compression chamber and the interior of said damper rod, valve means for providing one-way communication from the interior of said damper rod to said compression chamber comprising at least one replenishment hole provided in said damper rod, a slide movable within the lower end of said damper rod between a spring-biased position closing off said replenishment hole and a position leaving said replenishment hole open, at least one fluid passageway in said slide permitting axial flow of fluid through said slide, a compression plate spring-biased to close off said fluid passageway but permitting opening of said fluid passageway under a predetermined fluid pressure from fluid flow from said compression chamber through said compresson port.

10. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the lower end of said fork leg, said damper rod having a piston at its upper end slidably engaging the interior surface of said fork tube, a compression chamber defined between said fork leg and said damper rod below the lower end of said fork tube;

valve means for providing fluid communication between said compression chamber and the interior of said damper rod, a float tube positioned in said fork tube above said damper rod piston, floating means positioned within said float tube to float on the fluid within said float tube for preventing air from entering said damper rod, and a fluid regulation valve permitting replenishment fluid flow through said float tube into the interior of said float tube when said floating means reaches the bottom of its travel.

11. The apparatus of claim 10 including means for venting the interior of said fork assembly to atmosphere upon extension of the fork assembly.

12. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially incompressible fluid, a hollow damper rod connected at its lower end to the lower end of said fork leg, said damper rod having a piston at its upper end slidably engaging the interior surface of said fork tube, a compression chamber defined between said fork leg and said damper rod below the lower end of said fork tube;

valve means for providing fluid communication between said compression chamber and the interior of said damper rod, a float tube positioned in said fork tube above said damper rod piston, floating means positioned within said float tube to float on the fluid within said float tube for preventing air from entering said damper rod, and a fluid regulation valve permitting replenishment fluid flow into the interior of said float tube when said floating means reaches the bottom of its travel including at least one fluid replenishment port in said float tube, and a slider means slidably positioned within said float tube for movement across and closure of said fluid replenishment port, said slider means spring-biased for closure of said fluid replenishment port, cooperative means between said slider means and said float for opening said replenishment port when said float reaches the bottom of its travel.

13. A motorcycle front fork assembly comprising, in combination, an upper hollow cylindrical fork tube, a lower hollow cylindrical fork leg closed at its lower end, said fork tube and said fork leg telescopically, sealably movable with respect to one another and containing a substantially imcompressible fluid, a hollow damper rod connected at its lower end to the lower end of said fork leg, said damper rod having a piston at its upper end slidably engaging the interior surface of said fork tube, a compression chamber defined between said fork leg and said damper rod below the lower end of said fork tube;

valve means for providing fluid communication between said compression chamber and the interior of said damper rod, a float tube positioned in said fork tube above said damper rod piston, floating means positioned within said float tube to float on the fluid within said float tube for preventing air from entering said damper rod, and a fluid regulation valve permitting replenishment fluid flow into the interior of said float tube when said floating means reaches the bottom of its travel, said float tube including a plurality of grooves in the external surface thereof, a spring seat retaining ring adapted to be positioned in one of said grooves, and a spring seat slidable over said float tube for engagement with said spring seat retaining ring whereby said spring seat retaining ring can be positioned in selected different grooves.

14. The motor cycle front fork assembly in accordance with claim 13 wherein said valve means for providing fluid communication between said compression chamber and the interior of said damping rod, comprises a metering rod positioned within the bottom of said damper rod, at least one fluid passage through said damper rod, a sliding sleeve positioned between the interior surface of said damper rod and the exterior surface of said metering rod for closing off fluid flow through said fluid passage, first spring bias means biasing said sliding sleeve downward, said first bias means yielding upon compression of said front fork assembly to allow said slideing sleeve to move upward for flow of fluid from said compression chamber into said damper rod, second spring bias means biasing said sliding sleeve upward, said second bias means yielding upon extension of said front fork assembly to allow said slide to move downward for flow of fluid from said damper rod into said compression chamber, and at least one fluid bleed port through said damper rod below the normal rest position of said sliding sleeve in absence of compression or extension.

15. The apparatus of claim 14 including a tapered metering section on the outside surface of said metering rod exposed by travel of said sliding sleeve for controlling the damping of said front fork assembly, and means for adjusting the relative position between said sliding sleeve and said metering rod and said metering section.

16. The apparatus of claim 15 including at least one metering rod bleed port through said metering rod and means for controlling flow of fluid through said metering rod bleed port for adjusting the low speed damping of said front fork assembly.

17. A motorcycle front fork assembly comprising, in combination, an upper hollow cylindrical fork tube, a lower holow cylindrical fork leg closed at its lower end, said fork tube and said fork leg telescopically, sealably movable with respect to one another and containing a substantially impressible fluid, a hollow damper rod connected at its lower end to the lower end of said fork leg, said damper rod having a piston at its upper end slidably engaging the interior surface of said fork tube, a compression chamber defined between said fork leg and said damper rod below the lower end of said fork tube;

valve means for providing fluid communication between said compression chamber and the interior of said damper rod, a float tube positioned in said fork tube above said damper rod piston, floating means positioned within said float tube to float on the fluid within said float tube for preventing air from entering said damper rod, and a fluid regulation valve permitting replenishment fluid flow into the interior of said float tube when said floating means reaches the bottom of its travel, said valve means for providing communication between said compression chamber and the interior of said damper rod comprising at least one replenishment hole provided in said damper rod, a slide movable within the lower end of said damper rod between a position closing off said replenishment hole and a position leaving said replenishment hole open, a compression hole provided in said damper rod below said replenishment hole and said slide, at least one fluid passageway in said slide permitting axial flow of fluid through said slide and a compression plate spring-biased to close off said fluid passageway but permitting opening of said fluid passageway under a predetermined fluid pressure from fluid flow from said compression chamber through said compression hole.

18. A damping replacement kit for motorcycle fork assemblies which include an upper hollow cylindrical fork tube and a lower hollow cylindrical fork leg closed at its lower end with said fork tube and said fork leg telescopically, sealably movable with respect to one another and containing a substantially incompressible fluid, comprising, in combination:

a hollow damper rod for connection at its lower end to the lower end of said fork leg, said damper rod having a piston at its upper end slidably engaging the interior surface of said fork tube a compression chamber defined between said fork leg and said damper rod below the lower end of said fork tube;

valve means providing fluid communication between said compression chamber and the interior or said damping rod, a float tube positioned in said fork tube above said damper rod piston, floating means positioned within said fork tube to float on the fluid within said float tube for preventing air from entering said damper rod, and a fluid regulation valve permitting replenishment fluid flow through said float tube into the interior of said float tube when said floating means reaches the bottom of its travel.

19. The apparatus of claim 18 wherein said valve means for providing fluid communication between said compression chamber and the interior of said damping rod, comprises a metering rod positioned within the bottom of said damper rod, at least one fluid passage through said damper rod, a sliding sleeve positioned between the interior surface of said damper rod and the exterior surface of said metering rod for closing off fluid flow through said fluid passage, first spring bias means biasing said sliding sleeve downward, said first bias means yielding upon compression of said front fork assembly to allow said sliding sleeve to move upward for flow of fluid from said compression chamber into said damper rod, second spring bias means biasing said sliding sleeve upward, said second bias means yielding upon extension of said front fork assembly to allow said sliding sleeve to move downward for flow of fluid from said damper rod into said compression chamber, and at least one fluid bleed port through said damper rod below the normal rest position of said sliding sleeve in absence of compression or extension.

20. The apparatus of claim 19 including a tapered metering section on the outside surface of said metering rod exposed by travel of said sliding sleeve for controlling the damping of said front fork assembly, and means for adjusting the relative position between said sliding sleeve and said metering rod and said metering section.

21. The apparatus of claim 20 including at least one metering rod bleed port through said metering rod and means for controlling flow of fluid through said metering rod bleed port for adjusting the low speed damping of said front fork assembly.

22. A damping replacement kit for motorcycle fork assemblies which include an upper hollow cylindrical fork tube and a lower hollow cylindrical fork leg closed at its lower end with said fork tube and said fork leg telescopically, sealably movable with respect to one another and containing a substantially incompressible fluid, comprising, in combination:

a hollow damper rod for connection at its lower end to the lower end of said fork leg, said damper rod having a piston at its upper end slidably engaging the interior surface of said fork tube a compression chamber defined between said fork leg and said damper rod below the lower end of said fork tube;

valve means providing fluid communication between said compression chamber and the interior or said damping rod, a float tube positioned in said fork tube above said damper rod piston, floating means positioned within said fork tube to float on the fluid within said float tube for preventing air from entering said damper rod, and a fluid regulation valve permitting replenishment fluid flow into the interior of said float tube when said floating means reaches the bottom of its travel including at least one fluid replenishment port in said float tube, and a slider means slidably positioned within said float tube for movement across and closure of said fluid replenishment port, said slider means spring-biased for closure of said fluid replenishment port, cooperative means between said slider means and said float for opening said replenishment port when said float reaches the bottom of its travel.

23. A damping replacement kit for motorcycle fork assemblies which include an upper hollow cylindrical fork tube and a lower hollow cylindrical fork leg closed at its lower end with said fork tube and said fork leg telescopically, sealably movable with respect to one another and containing a substantially incomprssible fluid, comprising, in combination:

a hollow damper rod for connection at its lower end to the lower end of said fork leg, said damper rod having a piston at its upper end slidably engging the interior surface of said fork tube a compression chamber defined between said fork leg and said damper rod below the lower end of said fork tube;

valve means providing fluid communication between said compression chamber and the interior or said damping rod, a float tube positioned in said fork tube above said damper rod piston, floating means positioned within said fork tube to float on the fluid within said float tube for preventing air from entering said damper rod, and a fluid regulation valve permitting replenishment fluid flow into the interior of said float tube when said floating means reaches the bottom of its travel, said float tube including a plurality of grooves in the external surface thereof, a spring seat retaining ring adapted to be positioned in one of said grooves, and a spring seat slidable over said float tube for engagement with said spring seat retaining ring whereby said spring seat retaining ring can be positioned in selected different grooves.

24. A camping replacement kit for motorcycle fork assemblies which include an upper hollow cylindrical fork tube and a lower hollow cylindrical fork leg closed at its lower end with said fork tube and said fork leg telescopically, sealably movable with respect to one another and containing a substantially incompressible fluid, comprising, in combination:

a hollow damper rod for connection at its lower end to the lower end of said fork leg, said damper rod having a piston at its upper end slidably engaging the interior surface of said fork tube a compression chamber defined between said fork leg and said damper rod below the lower end of said fork tube;

valve means providing fluid communication between said compression chamber and the interior or said damping rod, a float tube positioned in said fork tube above said damper rod piston, floating means positioned within said fork tube to float on the fluid within said float tube for preventing air from entering said damper rod, and a fluid regulation valve permitting replenishment fluid flow into the interior of said float tube when said floating means reaches the bottom of its travel, said valve means for providing communication between said compression chamber and the interior of said damper rod comprising at least one replenishment hole provided in said damper rod, a slide movable within the lower end of said damper rod between a position closing off said replenishment hole and a position leaving said replenishment hole open, a compression hole provided in said damper rod below said replenishment hole and said slide, at least one fluid passageway in said slide permitting axial flow of fluid through said slide and a compression plate spring-biased to close off said fluid passageway but permitting opening of said fluid passageway under a predetermined fluid pressure from fluid flow from said compression chamber through said compression hole.

* * * * *